United States Patent
Li et al.

(10) Patent No.: US 11,128,867 B2
(45) Date of Patent: Sep. 21, 2021

(54) METHOD AND APPARATUS FOR VIDEO CODING

(71) Applicant: Tencent America LLC, Palo Alto, CA (US)

(72) Inventors: Xiang Li, Los Gatos, CA (US); Xin Zhao, San Diego, CA (US); Shan Liu, San Jose, CA (US); Meng Xu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/668,843

(22) Filed: Oct. 30, 2019

(65) Prior Publication Data
US 2020/0092561 A1    Mar. 19, 2020

Related U.S. Application Data

(63) Continuation of application No. 16/218,233, filed on Dec. 12, 2018, now Pat. No. 10,516,885.
(Continued)

(51) Int. Cl.
*H04N 19/132* (2014.01)
*H04N 19/159* (2014.01)
*H04N 19/176* (2014.01)
*H04N 19/105* (2014.01)
*H04N 19/119* (2014.01)

(52) U.S. Cl.
CPC ......... *H04N 19/132* (2014.11); *H04N 19/105* (2014.11); *H04N 19/119* (2014.11); *H04N 19/159* (2014.11); *H04N 19/176* (2014.11)

(58) Field of Classification Search
None
See application file for complete search history.

(56) References Cited

U.S. PATENT DOCUMENTS 10,873,772 B2 * 12/2020 Rossato ............. H04N 21/6587
2013/0259128 A1    10/2013 Song
(Continued)

OTHER PUBLICATIONS

Y. Zhao, H. Yang, J. Chen, "CE6: Spatially Varying Transform (Test 6.1.12.1)", JVET-K0139-v3, Ljubljana, SI, Jul. 10-18, 2018.

*Primary Examiner* — Talha M Nawaz
(74) *Attorney, Agent, or Firm* — Oblon, McClelland, Maier & Neustadt, L.L.P.

(57) ABSTRACT

Aspects of the disclosure provide a method and an apparatus for video coding. In some embodiments, the apparatus includes processing circuitry. The processing circuitry can decode encoding information for a block of a picture in a coded video bitstream. The encoding information indicates a position of a sub-region in the block and a position of an additional sub-region in each of at least one neighboring block of the block. A combined sub-region includes the sub-region and the additional sub-region in each of the at least one neighboring block. The combined sub-region is at a center of a combined block including the block and the at least one neighboring block. The processing circuitry can reconstruct first samples that are inside the combined sub-region using residue data of the first samples and reconstruct second samples that are outside of the combined sub-region in the combined block without residue data.

20 Claims, 16 Drawing Sheets

Related U.S. Application Data

(60) Provisional application No. 62/693,530, filed on Jul. 11, 2018.

(56) References Cited

U.S. PATENT DOCUMENTS

| | | | |
|---|---|---|---|
| 2013/0294523 A1* | 11/2013 | Rossato | H04N 19/82 |
| | | | 375/240.18 |
| 2016/0286232 A1* | 9/2016 | Li | H04N 19/139 |
| 2016/0337661 A1 | 11/2016 | Pang | |
| 2017/0099490 A1 | 4/2017 | Seregin | |
| 2017/0195671 A1 | 7/2017 | Choi | |
| 2018/0205965 A1 | 7/2018 | Chen | |
| 2019/0141318 A1 | 5/2019 | Li | |
| 2019/0268618 A1* | 8/2019 | Bankoski | H04N 19/176 |
| 2019/0320208 A1* | 10/2019 | Bjorklund | H04N 19/70 |
| 2020/0228831 A1* | 7/2020 | Heo | H04N 19/11 |

\* cited by examiner

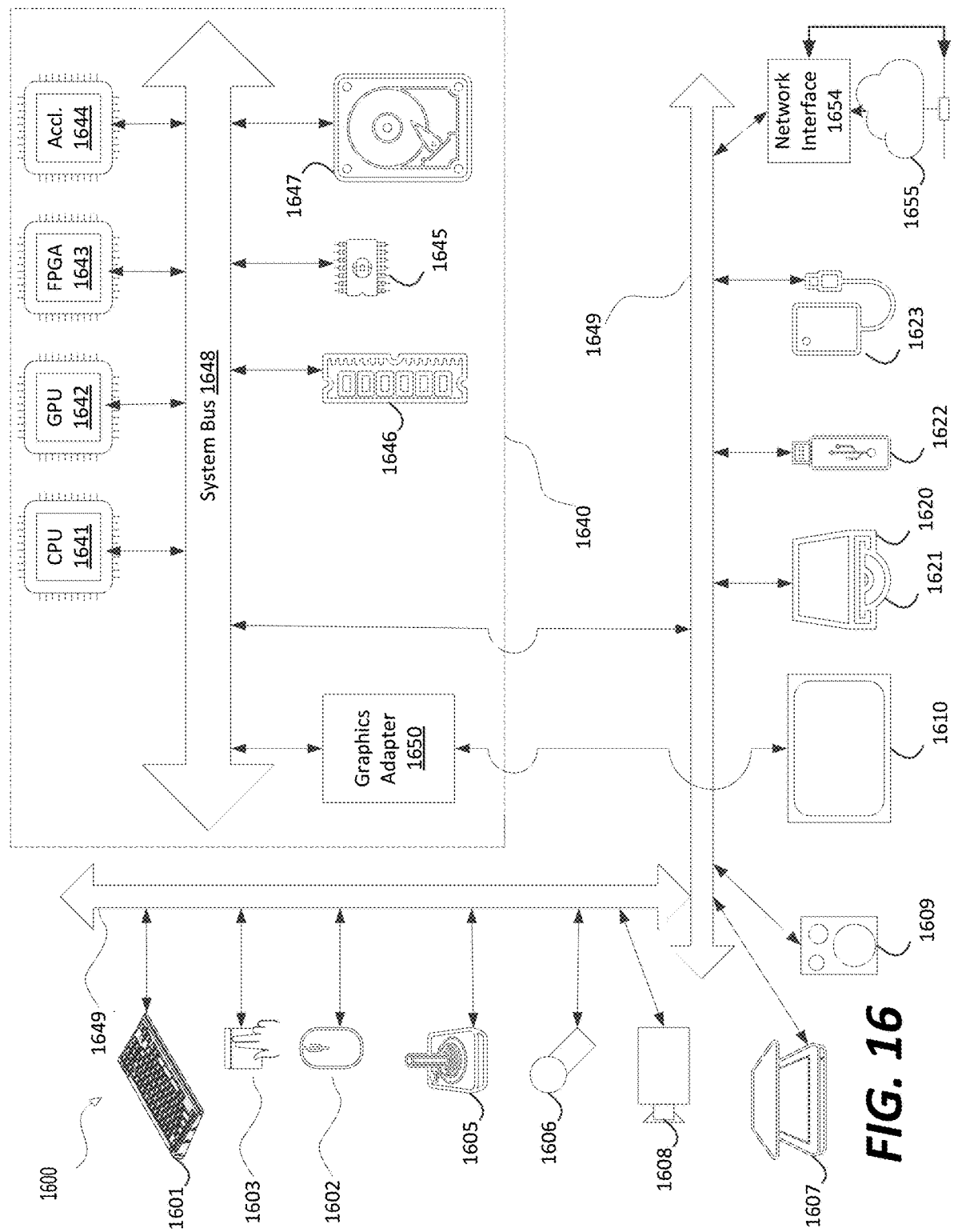

METHOD AND APPARATUS FOR VIDEO CODING

CROSS REFERENCE TO RELATED APPLICATIONS

The present application is a Continuation Application of U.S. application Ser. No. 16/218,233, filed Dec. 12, 2018, which claims the benefit of priority to U.S. Provisional Application No. 62/696,530, filed on Jul. 11, 2018, the contents of which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide a method and an apparatus for video coding. In some embodiments, the apparatus includes processing circuitry. The processing circuitry can decode encoding information for a block of a picture in a coded video bitstream. The encoding information indicates a position of a sub-region in the block and a position of an additional sub-region in each of at least one neighboring block of the block. A combined sub-region includes the sub-region and the additional sub-region in each of the at least one neighboring block. The combined sub-region is at a center of a combined block including the block and the at least one neighboring block. The processing circuitry can reconstruct first samples that are inside the combined sub-region using residue data of the first samples and reconstruct second samples that are outside of the combined sub-region in the combined block without residue data.

In an embodiment, the combined sub-region and the combined block have a rectangular shape. In an example, a number of the at least one neighboring block is one and the at least one neighboring block is located to one of: the right of the block and below the block. In an example, a number of the at least one neighboring block is three and the block is located at a top-left corner of the combined block. In an example, a width ratio of a width of the combined sub-region over a width of the combined block is 1/2, and a height ratio of a height of the combined sub-region over a height of the combined block is 1/2.

In an embodiment, the block and the at least one neighboring block are coded using inter prediction, and motion prediction information for the block is different from motion prediction information for the at least one neighboring block.

In an embodiment, the block and the at least one neighboring block are coded using inter prediction, motion prediction information for the block and the at least one neighboring block is signaled before information of the residue data of the first samples.

In an embodiment, the encoding information further indicates a size of the sub-region and a size of the additional sub-region in each of the at least one neighboring block of the block.

Aspects of the disclosure provide a method for video coding. The method can include decoding encoding information for a block of a picture in a coded video bitstream where the encoding information indicates a combination of a position of a sub-region in the block and a relative size of the sub-region with respect to the block. First samples inside the sub-region are reconstructed using residue data of the first samples, second samples of the block that are outside of the sub-region are reconstructed without residue data, and the combination of the position and the relative size is one of multiple combinations of different positions and different relative sizes. The method includes reconstructing the first samples of the block that are inside the sub-region using the residue data of the first samples and reconstructing the second samples of the block that are outside of the sub-region without residue data.

In an embodiment, the block and the sub-region have a rectangular shape. The relative size is associated with a width ratio being a width of the sub-region over a width of the block and a height ratio being a height of the sub-region over a height of the block. The multiple combinations of different positions and different relative sizes include: 1) the position is a center of the block, the width ratio and the height ratio are 1/2, 2) the position is a center of the block, the width ratio is 1/2 and the height ratio is 1, 3) the position is a left side of the block, the width ratio is 1/4 and the height ratio is 1, 4) the position is a right side of the block, the width ratio is 1/4 and the height ratio is 1, 5) the position is a center of the block, the width ratio is 1 and the height ratio is 1/2, 6) the position is a top side of the block, the width ratio is 1 and the height ratio is 1/4, and 7) the position is a bottom side of the block, the width ratio is 1 and the height ratio is 1/4.

In an embodiment, the encoding information includes an index indicating the one of the multiple combinations of different positions and different relative sizes. The method further includes receiving the index in the coded video bitstream. In an embodiment, the different relative sizes include a relative size of the sub-region being 1/4 of the block.

BRIEF DESCRIPTION OF THE DRAWINGS

Further features, the nature, and various advantages of the disclosed subject matter will be more apparent from the following detailed description and the accompanying drawings in which:

FIG. 16 is a schematic illustration of a computer system in accordance with an embodiment.

DETAILED DESCRIPTION OF EMBODIMENTS

Figure 1:
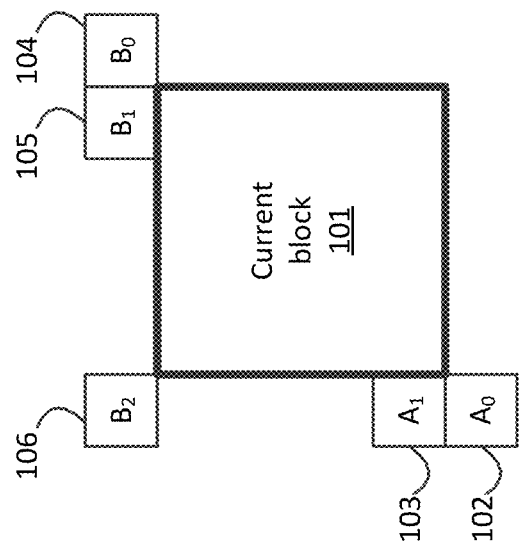
FIG. 1 is a schematic illustration of a current block and its surrounding spatial merge candidates in one example.
Figure 2:
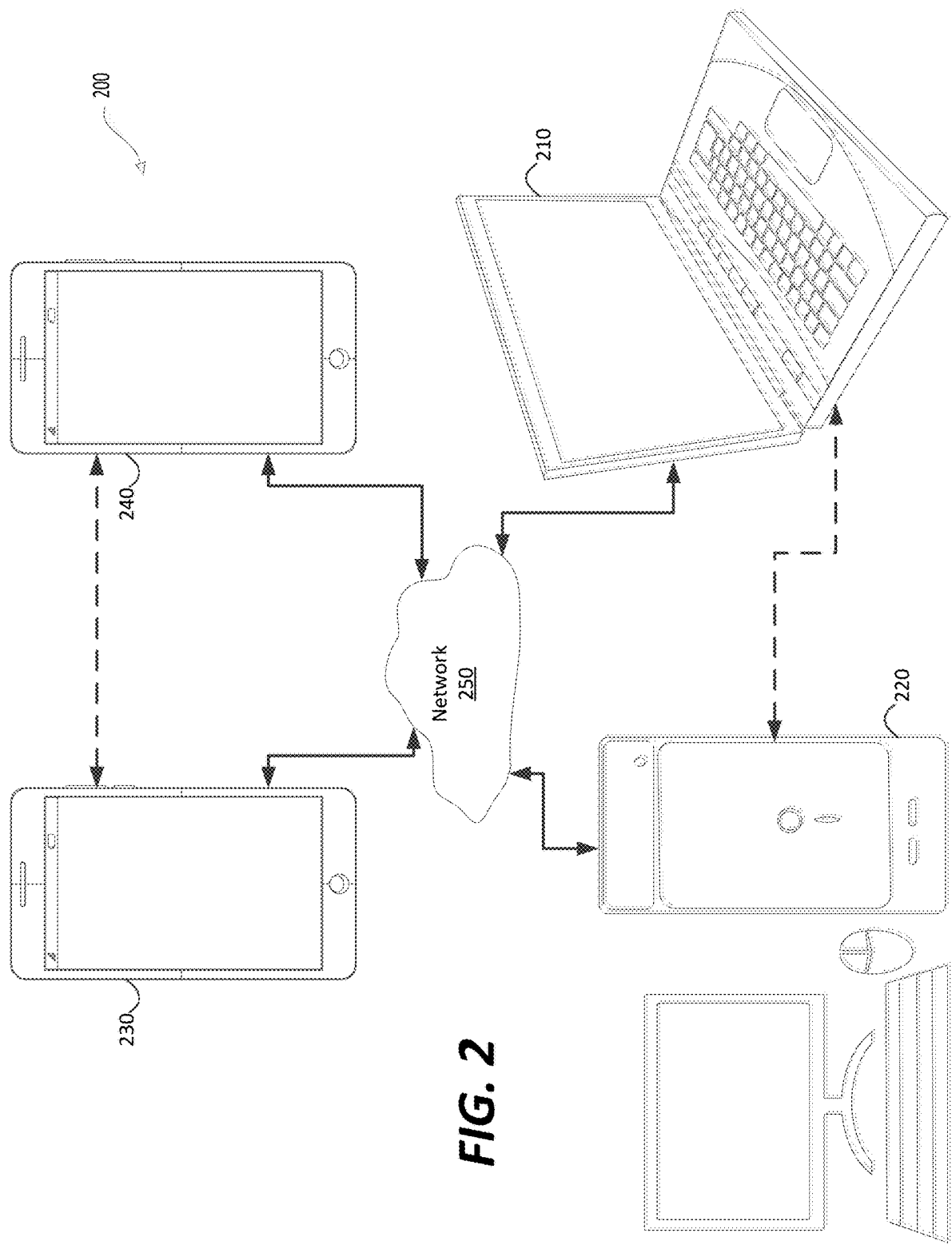
FIG. 2 is a schematic illustration of a simplified block diagram of a communication system (200) in accordance with an embodiment.

FIG. 2 illustrates a simplified block diagram of a communication system (2 00) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240)

via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
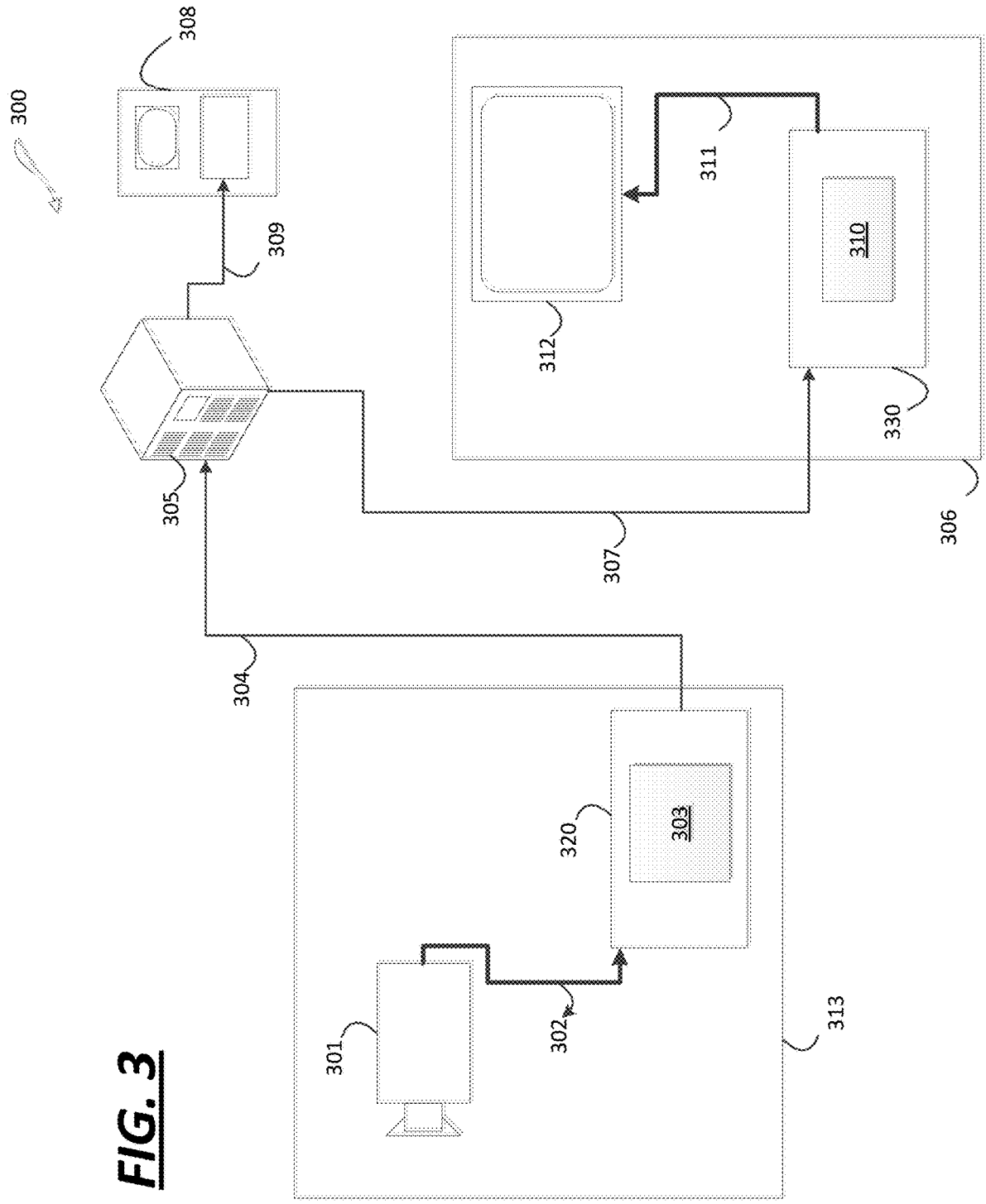
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
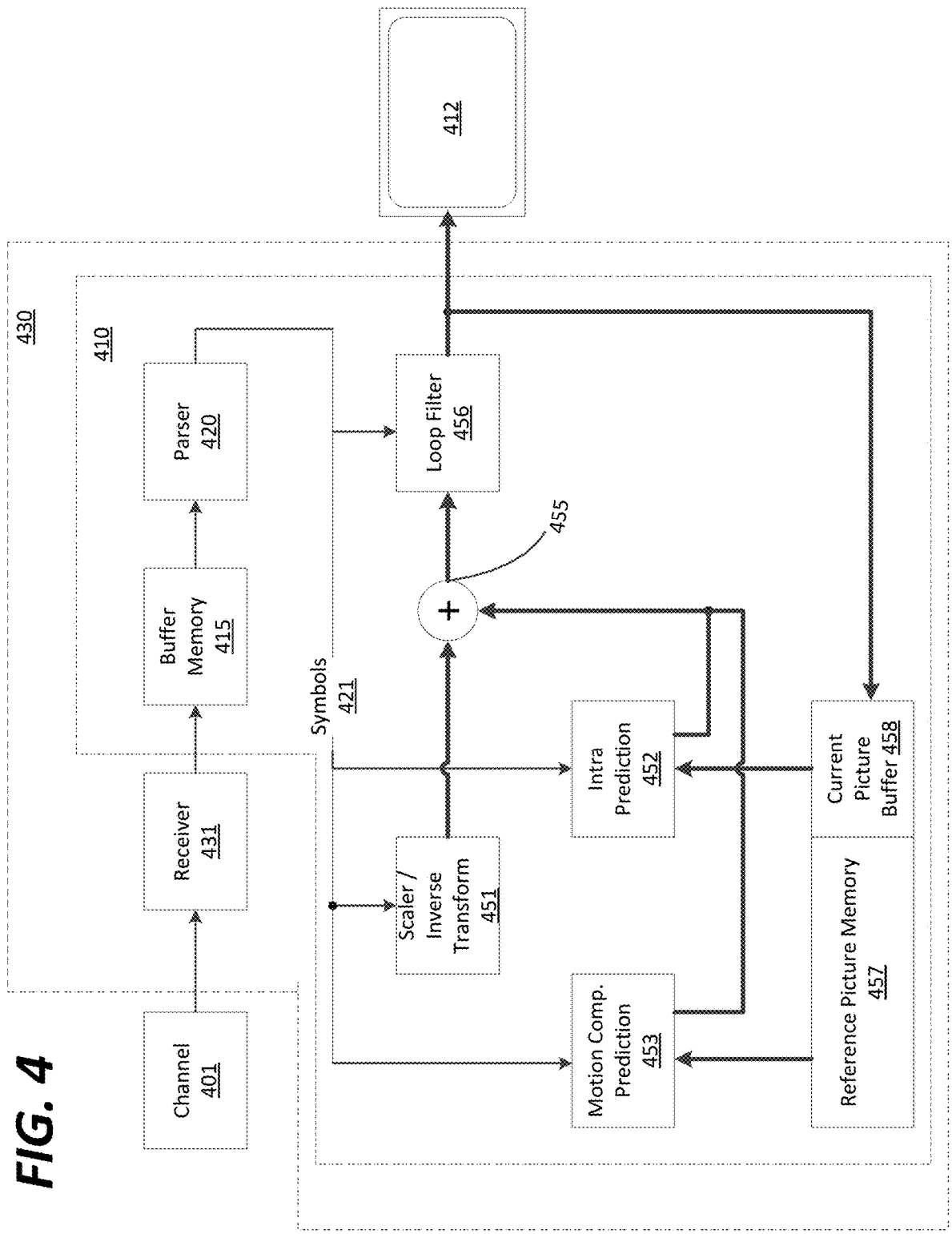
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
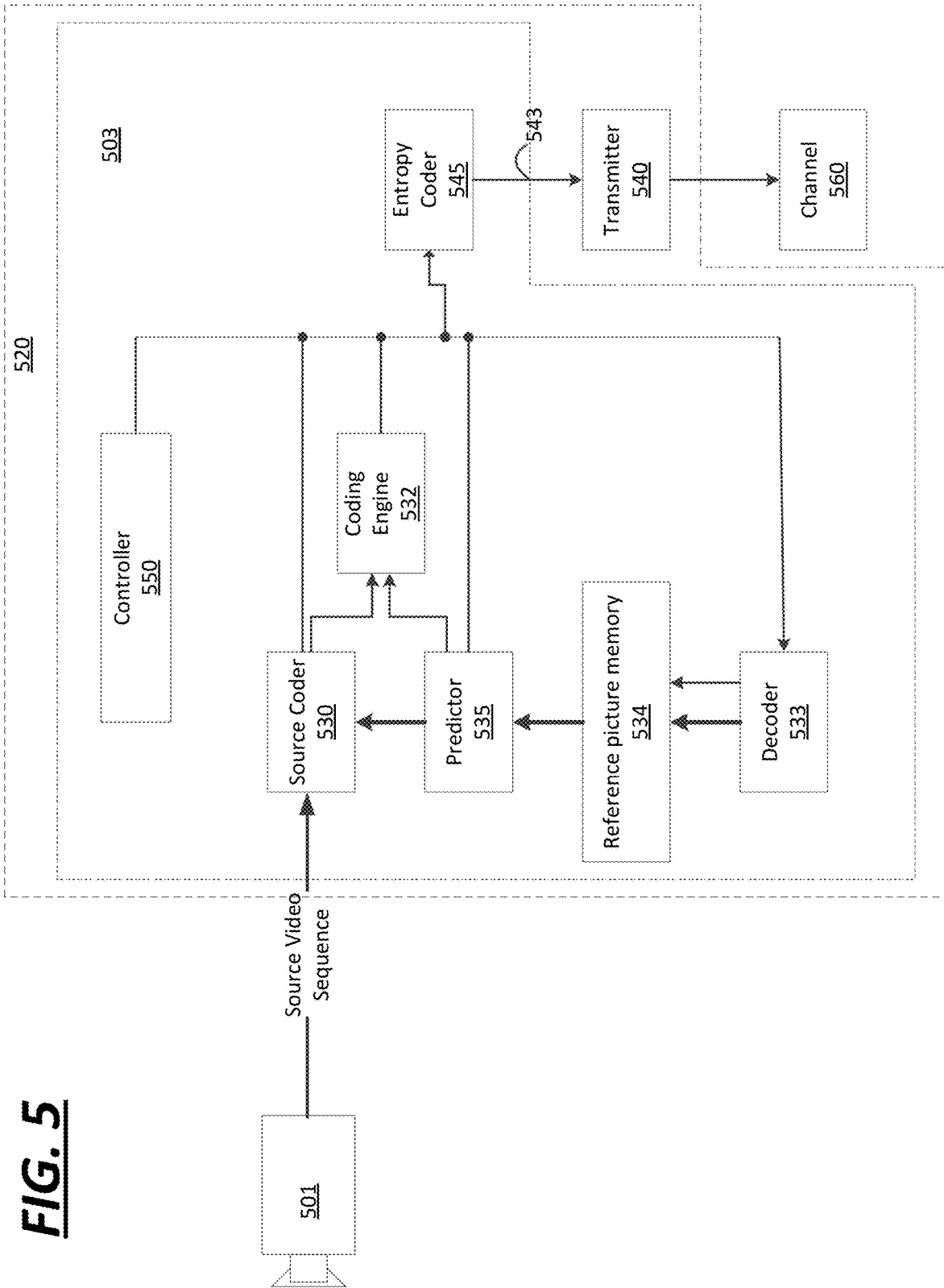
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, ... ), any color space (for example, BT.601 Y CrCB, RGB, ... ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, ... ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
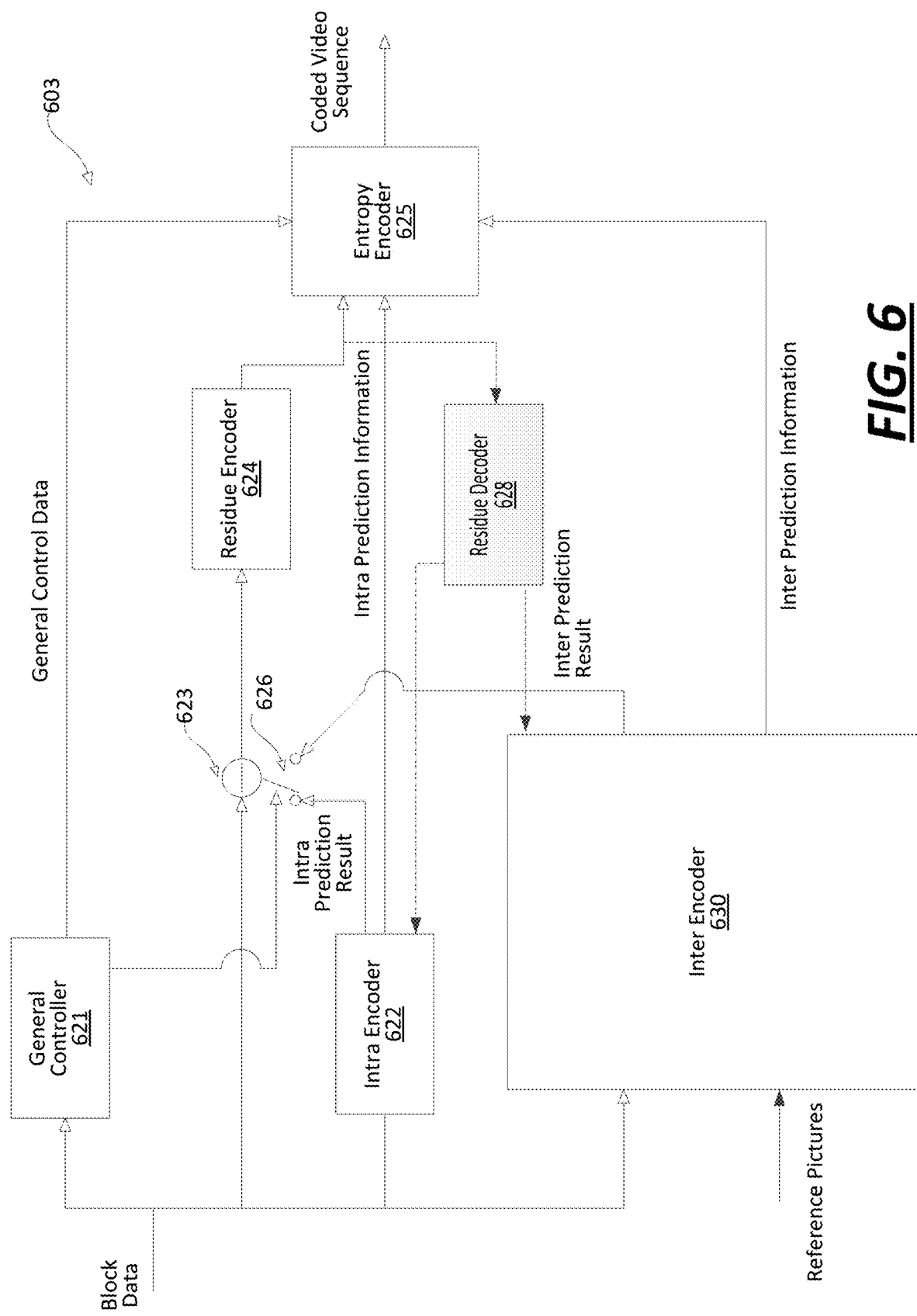
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
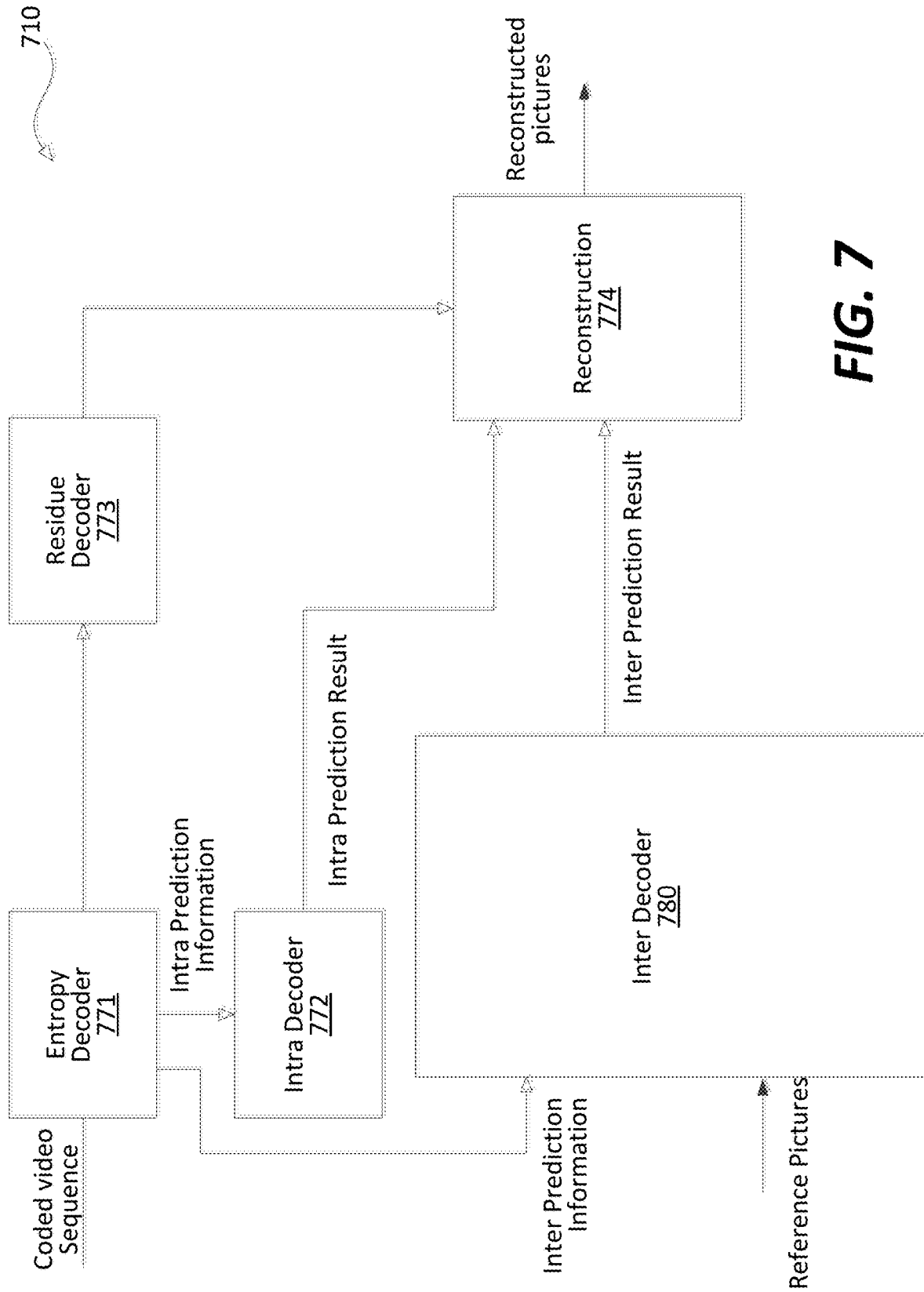
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

A picture can be split into a plurality of CTUs. In some examples, a CTU is split into CUs by using a quadtree (QT) structure denoted as a coding tree to adapt to various local characteristics of the picture. The decision whether to code a picture area using an inter-picture prediction (also referred to as a temporal prediction or an inter prediction type), an intra-picture prediction (also referred to as a spatial prediction, or an intra-prediction type), and the like is made at the CU level. In an embodiment, each CU can be further split into one, two or four PUs according to a PU splitting type. Inside one PU, the same prediction process is applied and the same prediction information is transmitted to a decoder on a PU basis. After obtaining residual data or residual information by applying the prediction process based on the PU splitting type, the CU can be partitioned into TUs according to another QT structure similar to the coding tree for the CU. In an example, a transform is applied for each TU, and a TU has the same transform information. The HEVC structure has multiple partition units including a CU, a PU, and a TU. Samples in a CU can have the same prediction type, samples in a PU can have the same prediction information, and samples in a TU can have same transform information. A CU or a TU is limited to a square shape, while a PU can have a square or a rectangular shape for an inter-predicted block according to an embodiment. Further, PUs having rectangular shapes can be used for an intra prediction in an embodiment. In an embodiment, such as in the VVC standard, each CU only contains one PU, and the CU (or PU) and a TU can have a rectangular shape.

An implicit QT split is applied to a CTU located at a picture boundary to recursively split the CTU into a plurality of CUs so that each CU is located inside the picture boundary.

In general, an inter prediction, an intra-prediction, and/or the like can be used for prediction in some embodiments. The intra-prediction can have 67 intra prediction modes (or intra modes) including a DC mode, a planar mode, and 65 angular modes (also referred to as directional intra prediction modes or directional intra modes) corresponding to 65 angular directions, respectively. To accommodate the 65 directional intra modes, an intra mode coding method with 6 Most Probable Modes (MPMs) can be used. The intra mode coding method can include derivation of the 6 MPMs and entropy coding of the 6 MPMs and 61 non-MPM modes.

A MPM list can include modes in the 6 MPMs. The modes in the MPM list can be classified into three groups: a first group including neighboring intra prediction modes (also referred to as neighbor intra modes), a second group including derived intra modes, and a third group including default intra modes. In an example, five neighboring intra prediction modes from the first group are used to form a MPM list. When the MPM list is not full (i.e., there are less than 6 MPM candidates in the MPM list), one or more derived intra modes from the second group are added. The one or more derived intra modes can be obtained by adding −1 or +1 to one or more angular modes in the MPM list. In an example, the one or more derived modes are not generated from non-angular modes including the DC mode and the planar mode. Further, when the MPM list is still not full, one or more default intra modes from the third group are added in a following order: the vertical intra mode, the horizontal intra mode, the intra mode 2, and the diagonal intra mode. Accordingly, the MPM list of the 6 MPM modes is generated.

The 61 non-MPM modes can be coded as follows. The 61 non-MPM modes can be divided into two sets: a selected mode set (referred to as secondary MPMs) and a non-selected mode set. The selected mode set includes 16 of the 61 non-MPM modes and the non-selected mode set includes 45 of the remaining of the 61 non-MPM modes. In an example, a flag in a bitstream can be used to indicate a mode set (i.e., the selected mode set or the non-selected mode set) to which the current intra mode belongs. When the current intra mode is in the selected mode set, the current mode is signaled with a 4-bit fixed-length code, and when the current intra mode is in the non-selected mode set, the current intra mode is signaled with a truncated binary code.

In general, residual coding is implemented for both inter and intra coded blocks. For example, a prediction error or residue of a block after prediction can be transformed into transform coefficients and subsequently coded. In an example, such as in the HEVC standard, discrete cosine transform (DCT) kernel of type II (DCT-II) and 4×4 discrete sine transform (DST) kernel of type VII (DST-VII) can be employed for transform, such as in a forward core transform at an encoder side and an inverse core transform at a decoder side. In addition to DCT-II and 4×4 DST-VII, an Adaptive Multiple core Transform (AMT) or Enhanced Multiple Transform (EMT) method is used for residual coding for both inter and intra coded blocks. In the AMT, multiple selected transforms from the DCT/DST families other than, for example, the current transforms in the HEVC standard, can be used. The multiple selected transforms from the DCT/DST families can include DST-VII, DCT-VIII, DST-I, DCT-V, and the like. Table 1 shows basis functions of certain DST/DCT transforms.

In order to maintain orthogonality of a transform matrix, the transform matrix can be quantized more accurately with a 10-bit representation instead of an 8-bit representation. To keep intermediate values of transformed coefficients within a range of 16-bits, after a horizontal and/or after a vertical transform, the transformed coefficients are right shifted by 2 more bits, for example, comparing to the 7 bit right shift after the first vertical inverse transform used in the HEVC transforms.

In an example, an AMT is applicable to CUs with both a width and a height that is smaller than or equal to 64, and whether an AMT is applicable can be controlled by a CU level flag. When the CU level flag is 0, a DCT-II is applied in the CU to encode a residue of the CU. For a luma coding block within an AMT enabled CU, two additional flags are signaled to identify the respective horizontal and vertical transform to be used. The residue of the block can be coded with a transform skip mode. To avoid redundancy of syntax coding, the transform skip flag is not signaled when the CU level flag is not zero.

TABLE 1

Transform basis functions of DCT-II/V/VIII and DST-I/VII for an N-point input.

| Transform Type | Basis function $T_i(j)$, i, j = 0, 1, ..., N − 1 |
|---|---|
| DCT-II | $T_i(j) = \omega_0 \cdot \sqrt{\frac{2}{N}} \cdot \left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$, where $\omega_0 = \begin{cases} \sqrt{\frac{2}{N}} & i = 0 \\ 1 & i \neq 0 \end{cases}$, $\omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |

TABLE 1-continued

Transform basis functions of DCT-II/V/VIII and DST-I/VII for an N-point input.

| Transform Type | Basis function $T_i(j)$, i, j = 0, 1, ..., N − 1 |
|---|---|
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In an embodiment, for an intra residue coding, due to different residue statistics associated with different intra prediction modes, a mode-dependent transform candidate selection process can be used. Three transform subsets can be defined as shown in Table 2, and a transform subset is selected based on an intra prediction mode, as specified in Table 3. For example, a transform subset is identified based on Table 3 using an intra prediction mode of a CU when the CU level flag is 1 which indicates that AMT is used. In addition, for each of the horizontal and the vertical transforms, one of two transform candidates in the identified transform subset is selected based on explicit signalling with one or more flags and Table 2.

TABLE 2

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

TABLE 3

Examples of horizontal and vertical transform sets for each intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

In an embodiment, for an inter residue coding, one transform set including DST-VII and DCT-VIII can be used for various inter prediction modes and for both the horizontal and the vertical transforms.

Complexity of an AMT can be relatively high at an encoder side, for example, when a brute-force search is used where five (DCT-II and four multiple transform candidates as shown in Table 1) different transform candidates are evaluated with a rate-distortion cost for each residual block. To alleviate the complexity of the AMT at the encoder side, various optimization methods can be designed for algorithm acceleration, for example, in the JEM standard.

In an embodiment, a mode-dependent non-separable secondary transform (NSST) can be used between a forward core transform and a quantization at an encoder side and between a de-quantization and an inverse core transform at a decoder side. For example, to keep a low complexity, a NSST is applied to low frequency coefficients after a primary transform (or a core transform). When both a width (W) and a height (H) of a transform coefficient block are larger than or equal to 8, an 8×8 NSST is applied to a top-left 8×8 region of the transform coefficients block. Otherwise, when either the width W or the height H of the transform coefficient block is 4, a 4×4 NSST is applied, and the 4×4 NSST is performed on a top-left min(8,W)×min(8,H) region of the transform coefficient block. The above transform selection method is applied for both luma and chroma components.

A matrix multiplication implementation of a NSST is described as follows using a 4×4 input block as an example. The 4×4 input block X is written in Eq. (1) as $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad (1)$$

The input block X can be represented as a vector $\vec{X}$ in Eq. (2) where $$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T \quad (2)$$

The non-separable transform is calculated as $\vec{F} = T \cdot \vec{X}$ where $\vec{F}$ indicates a transform coefficient vector, and T is a 16×16 transform matrix. The 16×1 transform coefficient vector $\vec{F}$ is subsequently reorganized as a 4×4 block using a scanning order (for example, a horizontal scanning order, a vertical scanning order or a diagonal scanning order) for the input block X. Coefficients with smaller indices can be placed with smaller scanning indices in the 4×4 coefficient block. In some embodiments, a Hypercube-Givens Transform (HyGT) with a butterfly implementation can be used instead of the matrix multiplication described above to reduce the complexity of the NSST.

In an example, 35×3 non-separable secondary transforms are available for both 4×4 and 8×8 block sizes, where 35 is a number of transform sets associated with the intra prediction modes, and 3 is a number of NSST candidates for each intra prediction mode. Table 4 shows an exemplary mapping from an intra prediction mode to a respective transform set. A transform set applied to luma/chroma transform coefficients is specified by a corresponding luma/chroma intra prediction mode, according to Table 4. For an intra prediction mode larger than 34, which corresponds to a diagonal prediction direction, a transform coefficient block is transposed before/after the NSST at the encoder/decoder, respectively.

For each transform set, a selected NSST candidate can be further specified by an explicitly signaled CU level NSST index. The CU level NSST index is signaled in a bitstream for each intra coded CU after transform coefficients and a truncated unary binarization is used for the CU level NSST index. For example, a truncated value is 2 for the planar or the DC mode, and 3 for an angular intra prediction mode. In an example, the CU level NSST index is signaled only when there is more than one non-zero coefficient in the CU. The default value is zero and not signaled, indicating that a NSST is not applied to the CU. Each of values 1-3 indicates which NSST candidate is to be applied from the transform set.

TABLE 4

Mapping from an intra prediction mode to a transform set index

| Intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 |
| Intra mode | 17 | 18 | 19 | 20 | 21 | 22 | 23 | 24 | 25 | 26 | 27 | 28 | 29 | 30 | 31 | 32 | 33 |
| set | 17 | 18 | 19 | 20 | 21 | 22 | 23 | 24 | 25 | 26 | 27 | 28 | 29 | 30 | 31 | 32 | 33 |
| Intra mode | 34 | 35 | 36 | 37 | 38 | 39 | 40 | 41 | 42 | 43 | 44 | 45 | 46 | 47 | 48 | 49 | 50 |
| set | 34 | 33 | 32 | 31 | 30 | 29 | 28 | 27 | 26 | 25 | 24 | 23 | 22 | 21 | 20 | 19 | 18 |
| Intra mode | 51 | 52 | 53 | 54 | 55 | 56 | 57 | 58 | 59 | 60 | 61 | 62 | 63 | 64 | 65 | 66 | 67 (LM) |
| set | 17 | 16 | 15 | 14 | 13 | 12 | 11 | 10 | 9 | 8 | 7 | 6 | 5 | 4 | 3 | 2 | NULL |

In some embodiments, a NSST is not applied for a block coded with a transform skip mode. When the CU level NSST index is signaled for a CU and not equal to zero, a NSST is not used for a block that is coded with the transform skip mode in the CU. When the CU with blocks of all components are coded in a transform skip mode or a number of non-zero coefficients of non-transform-skip mode CBs is less than 2, the CU level NSST index is not signaled for the CU.

In an example, a NSST and an EMT are not used for a same CU when a QTBT is used for partition, and thus a NSST is used when DCT2 is used as a primary transform.

A HyGT is used in the computation of a NSST. Basic elements of the orthogonal HyGT are Givens rotations that are defined by orthogonal matrices G(m, n, θ) as follows:

$$G_{i,j}(m, n) = \begin{cases} \cos\theta, & i = j = m \text{ or } i = j = n, \\ \sin\theta, & i = m, j = n, \\ -\sin\theta, & i = n, j = m, \\ 1, & i = j \text{ and } i \neq m \text{ and } i \neq n, \\ 0, & \text{otherwise} \end{cases} \quad (2)$$

Figure 8:
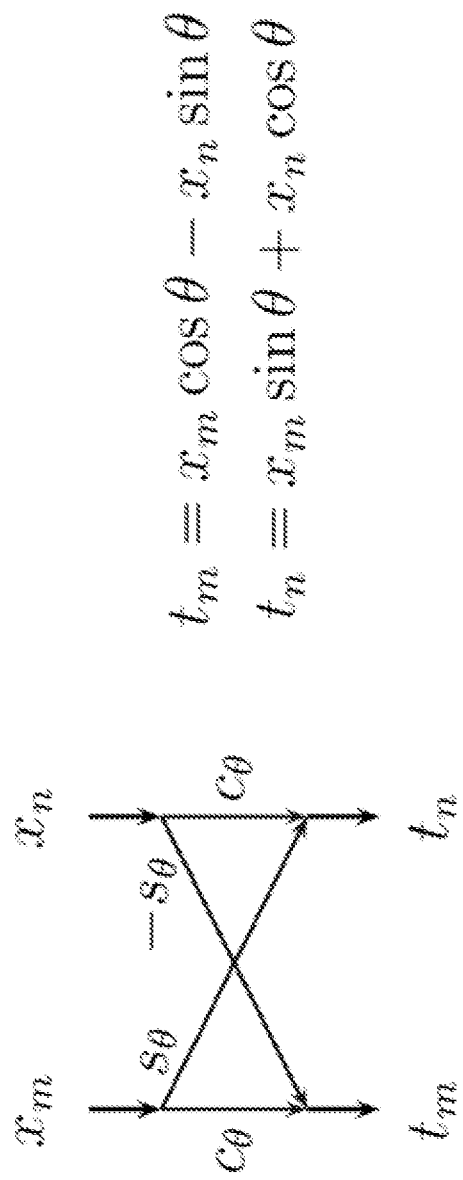
FIG. 8 shows Givens rotations according to an embodiment.
Figure 9:
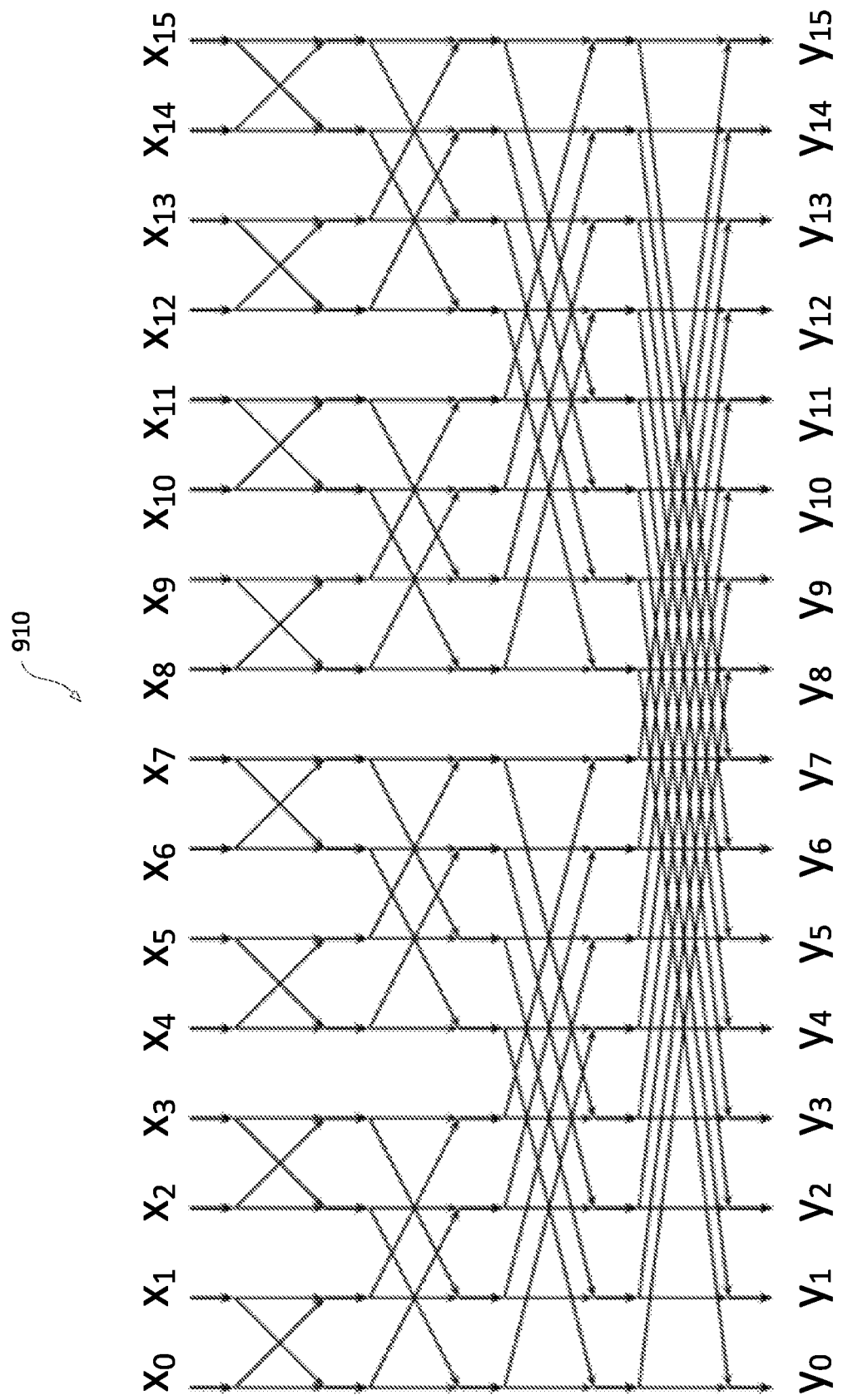
FIG. 9 shows a flowchart of a Hypercube-Givens Transform (HyGT) for a 16 elements NSST according to an embodiment.

FIG. 8 shows Givens rotations according to an embodiment of the disclosure. In an embodiment, the HyGT is implemented by combining sets of Givens rotations in a hypercube arrangement. FIG. 9 shows a "butterfly" shape flowchart (910) of the HyGT for a 16 elements (i.e., 4×4) NSST according to an embodiment of the disclosure. In an example, a HyGT round is defined as a sequence of log 2(N) passes where N is a power of two. In each pass, the indices in vectors m and n are defined by edges of a hypercube with a dimension of log 2(N), sequentially in each direction.

Figure 10:
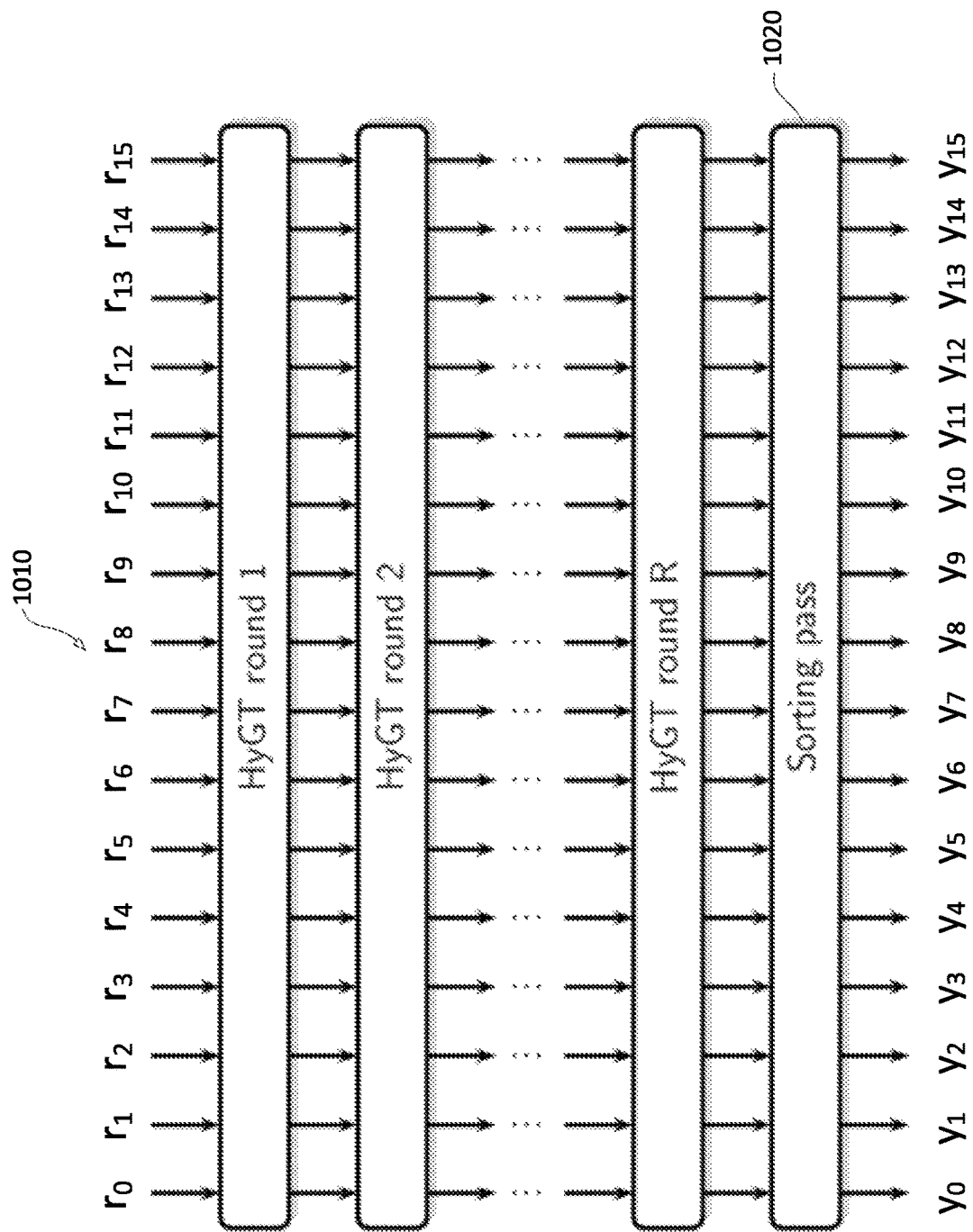
FIG. 10 shows HyGT rounds and an optional permutation pass according to an embodiment.

To obtain good compression, more than one HyGT round can be used. As shown in FIG. 10, a full NSST (1010) can include R HyGT rounds (R is a positive integer) and an optional permutation pass (1020) to sort transform coefficients according to corresponding variance. For example, in the JEM standard, 2 HyGT rounds are applied for a 4×4 NSST and 4 HyGT rounds are applied for an 8×8 NSST.

In some embodiments, samples in a CU are predicted using inter prediction to generate residual data of the samples. Subsequently, transform coefficients can be determined by applying a transform on the residual data of the samples in the CU. Alternatively, a CU can include a sub-region (also referred to as a first sub-region) and a remaining sub-region that is outside the sub-region (also referred to as a second sub-region). Transform coefficients of samples in the first sub-region (referred to as first samples) can be determined by applying a transform on residual data of the first samples in the first sub-region and no transform is performed on samples in the second sub-region (referred to as second samples). Therefore, the transform is applied to a portion (i.e., the first sub-region) of the CU that is less than the CU, and thus, the transform is referred to as a spatially varying transform (SVT). In some embodiments, residual data of the second sub-region are relatively small and can be forced to be zero.

In some examples, when a root level coded block flag indicates that the samples in the CU have non-zero transform coefficients (for example, root_cbf=1), a SVT flag (i.e, a svt_flag) can be signaled to indicate whether a SVT is used. In an example, when the SVT flag is 0, the SVT is not used, and a transform is applied to the samples of the CU. When the SVT flag is 1, the SVT is used, and a transform is applied to the first samples in the first sub-region of the CU. The first sub-region can be referred to as a TU.

In some embodiments, when a SVT is used for a CU, a SVT type and/or SVT position information can be encoded in a coded video bitstream at an encoder side and decoded from the coded video bitstream at a decoder side. Further, a specific SVT pattern, i.e., a specific arrangement of a TU within the CU, such as a width ratio of a TU width over a CU width, a height ratio of a TU height over a CU height, a position of the TU with respect to the CU, and the like, can be determined based on the SVT type and/or the SVT position information.

Figure 11:
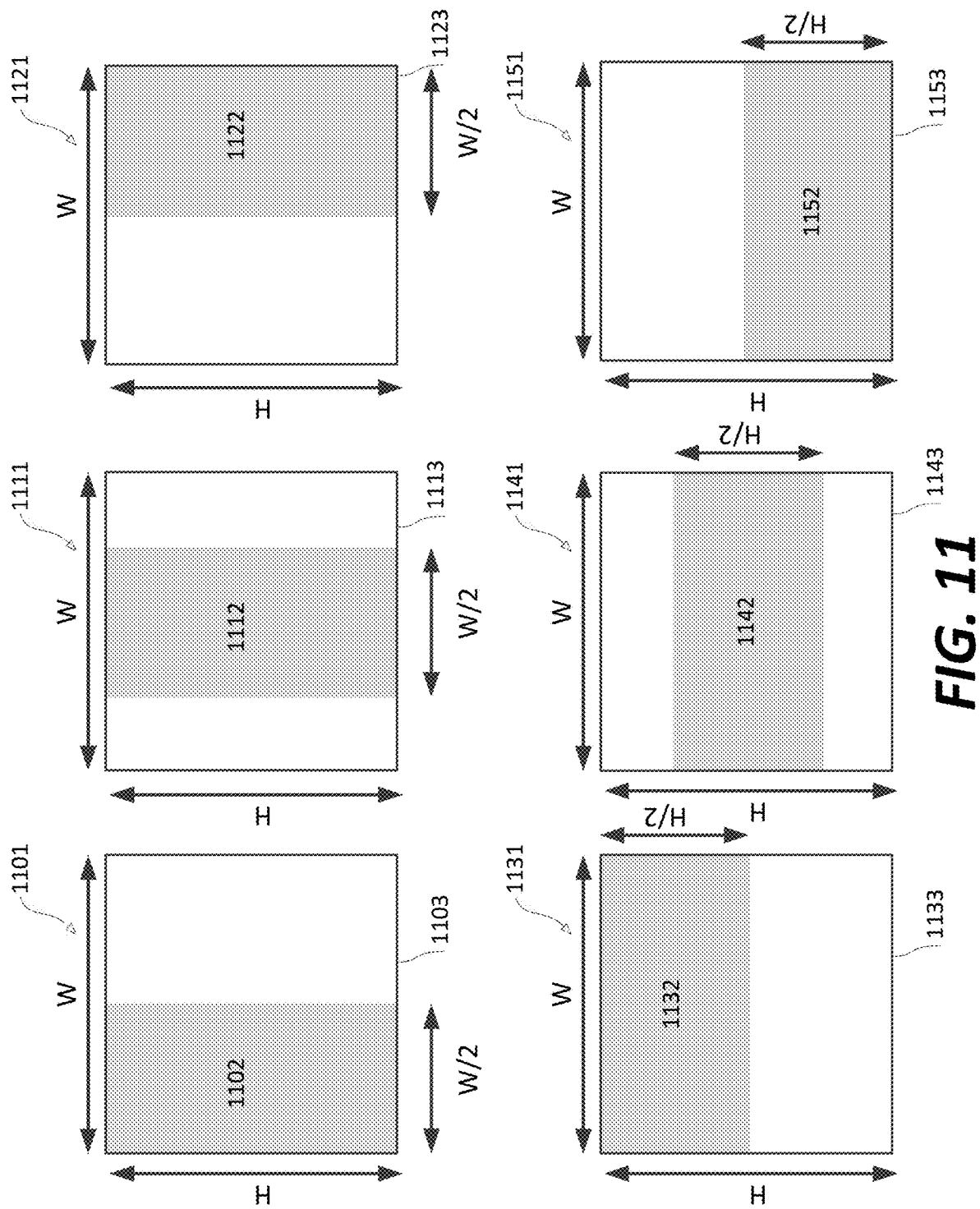
FIG. 11 shows examples of spatially varying transform (SVT) patterns according to some embodiments.

FIG. 11 shows SVT patterns of two SVT types, each with three SVT positions, according to an embodiment of the disclosure. The two SVT types include a vertical SVT (SVT-V) and a horizontal SVT (SVT-H). Three SVT patterns (1101), (1111), and (1121) with different SVT positions correspond to the SVT-V in which the TU width equals to 1/2 of the CU width W (i.e., the width ratio is 1/2) and the TU height is equal to the CU height H (i.e., the height ratio is 1). Further, the three TU positions are positioned at i/4 of the CU width W from a top-left corner of the respective CU (1103), (1113), and (1123), where i is 0, 1 and 3, respectively. The three positions are denoted as a vertical position 0, 1 and 2, respectively. TUs (1102), (1112), and (1122) are associated with the respective CUs (1103), (1113), and (1123), respectively.

Similarly, three SVT patterns (1131), (1141), and (1151) with different SVT positions correspond to the SVT-H in which the TU height equals to 1/2 of the CU height H (i.e., the height ratio is 1/2), the TU width is equal to the CU width W (i.e., the width ratio is 1), and the three TU positions are positioned at i/4 of the CU height H from a top-left corner of the respective CU (1133), (1143), and (1153), where i is 0, 1 and 3, respectively. The three positions are denoted as a horizontal position 0, 1 and 2, respectively. TUs (1132), (1142), and (1152) are associated with the respective CUs (1133), (1143), and (1153), respectively.

Both TU and CU boundaries can be filtered by de-blocking filtering. In an embodiment, the SVT-V (or the SVT-H) is enabled when a CU width (or a CU height) is in a range of [8, 32]. To ensure that a gap between two filtered boundaries is larger than or equal to 4 pixels, for example, the vertical position 1 is disabled when the CU width is smaller than or equal to 8 pixels, and the horizontal position 1 is disabled when the CU height is smaller than or equals to 8 pixels, A position-dependent core transform can be applied in the SVT where the three horizontal and vertical positions are associated with different core transforms. Table 5 shows an example of the horizontal and vertical transforms for the SVT patterns described above.

To reduce complexity of the SVT, the SVT is applied to certain modes according to some embodiments. For example, the SVT is applied to a merge mode (for the first two merge candidates) and an advanced motion vector prediction (AMVP) mode, but not to inter prediction modes including affine mode, a frame rate up conversion (FRUC) and integer motion vector resolution (IMV) in Benchmark Set (BMS) 1.0.

A fast algorithm can be designed for the SVT according to some embodiments. For each SVT pattern (or SVT mode), a rate distortion (RD) cost is estimated based on a sum of square differences (SSD) of a residual-skipped part. An SVT mode is skipped in a rate distortion optimization (RDO) when the estimated RD cost of the SVT mode is larger than an actual RD cost of the best mode. In addition, only the best three SVT modes in terms of the estimated RD cost are tried in the RDO.

TABLE 5

Horizontal and vertical transforms
for different SVT types and positions

| SVT type, position | horizontal transform | vertical transform |
|---|---|---|
| SVT-V, position 0 | DCT-8 | DST-7 |
| SVT-V, position 1 | DST-1 | DST-7 |
| SVT-V, position 2 | DST-7 | DST-7 |
| SVT-H, position 0 | DST-7 | DCT-8 |
| SVT-H, position 1 | DST-7 | DST-1 |
| SVT-H, position 2 | DST-7 | DST-7 |

In some embodiments, residual data of first samples in the first sub-region are relatively large and are encoded and transmitted to a decoder. Residual data of second samples in the second sub-region are relatively small and are not encoded. According to aspects of the disclosure, in a SVT, the first samples of the CU that are inside the first sub-region are reconstructed using the residual data of the first samples while the second samples of the CU that are outside the first sub-region are reconstructed without residual data. In general, the first sub-region can have any suitable shape and size, and can be located at any suitable position inside the CU. A shape, a size, and/or a position of the first sub-region can depend on the residual data of the samples in the CU. As will be described below, according to aspects of the disclosure, an area of the first sub-region is 1/4 of an area of the CU according to an embodiment. Further, the first sub-region can be located at any suitable position inside the CU. For example, the first sub-region can be at a center of the CU and separated from all edges of the CU.

As described above, the CU can be separated into different sub-regions based on the residual data (or the motion compensated residues) of the samples. The CU includes the first sub-region (i.e., a large residue sub-region) having the first samples with the relatively large residues and the second sub-region (i.e., a small residue sub-region) having second samples with the relatively small residues. Various methods can be used to determine the first sub-region and the second sub-region. In an example, the first sub-region and the second sub-region can be determined based on the residual data of the samples. For example, the residual data of the samples in the CU can be compared with a pre-determined residue threshold. The residual data of the first samples in the first sub-region are above the pre-determined residue threshold while the residual data of the second samples in the second sub-region are below or equal to the pre-determined residue threshold. Alternatively, the first sub-region and the second sub-region can be determined based on quantized transform coefficients associated with the residual data of the samples. For example, the first samples in the first region have non-zero quantized transform coefficients, and the second samples in the second region have no non-zero quantized transform coefficients.

At an encoder side, the transform coefficients of the first samples in the first sub-region can be determined by applying a transform on the residual data of the first samples inside the first sub-region. Further, the residual data of the second samples inside the second sub-region is not encoded. In an example, the relatively small residual data of the second samples can be set to zero. Accordingly, at a decoder side, the residual data of the first samples inside the first sub-region can be determined by implementing an inverse transform of the transform coefficients of the first samples, for example, received from a coded video bitstream.

Figure 12:
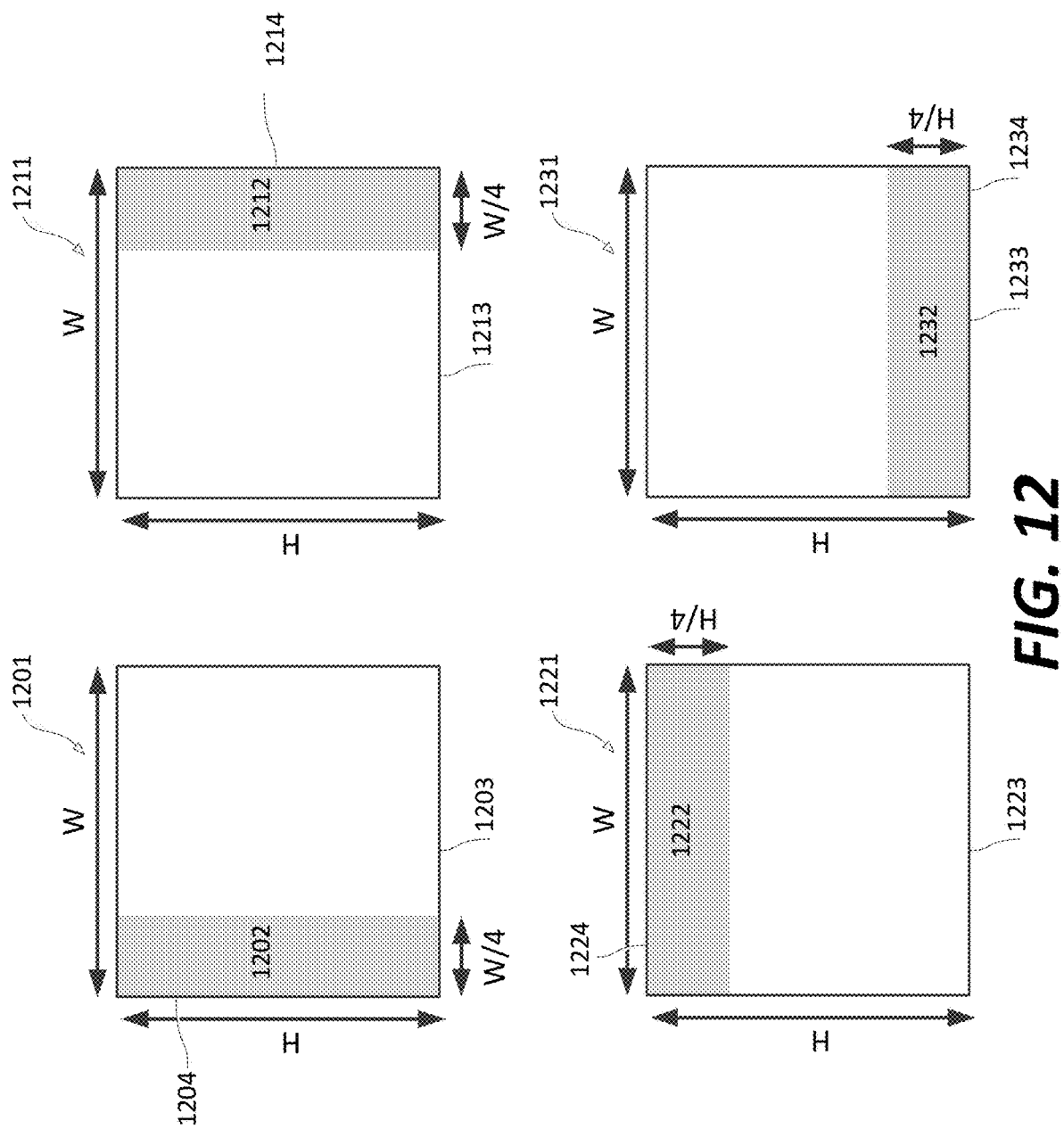
FIG. 12 shows examples of SVT patterns according to some embodiments.

FIG. 12 shows SVT patterns (1201), (1211), (1221), and (1231) according to some embodiments of the disclosure. Referring to FIG. 12, each CU (1203), (1213), (1223), and (1233) and a respective first sub-region (1202), (1212), (1222), and (1232) have a rectangular shape. In the top row, a width of each of the first sub-region (1202) and (1212) is 1/4 of a width (W) of each of the CU (1203) and (1213), resulting in a width ratio of 1/4, and each of the CUs (1203) and (1213) can be split vertically. A height of each of the first sub-region (1202) and (1212) is equal to a height (H) of each of the CUs (1203) and (1213). The first sub-region (1202) is adjacent to a left edge (1204) of the CU (1203). The first sub-region (1212) is adjacent to a right edge (1214) of the CU (1213). In the bottom row, a width of each of the first sub-region (1222) and (1232) is equal to a width (W) of each of the CUs (1223) and (1233), and each of the CU (1223) and (1233) can be split horizontally. A height of each of the first sub-regions (1222) and (1232) is 1/4 of a height (H) of each of the CUs (1223) and (1233), resulting in a height ratio of 1/4. The first sub-region (1222) is adjacent to a top edge (1224) of the CU (1223). The first sub-region (1232) is adjacent to a bottom edge (1234) of the CU (1233).

Referring to FIGS. 11 and 12, the SVT patterns (1101) and (1201) are similar except that a width ratio of 1/4 of the SVT pattern (1201) is smaller than a width ratio of 1/2 of the SVT pattern (1101). Accordingly, when a size of the CU (1103) is identical to a size of the CU (1203), a transform implemented on first samples in the first sub-region (1202) can be more efficient than a transform implemented on the first samples in the first sub-region (1102) because a number of the first samples in the first sub-region (1202) is less than a number of the first samples in first sub-region (1102). Therefore, when samples in the CU (1203) that have relatively large residues are located (or concentrated), for example, in 1/4 of the area of the CU (1203) and are near the left edge (1204), the SVT pattern (1201) is used instead of the SVT pattern (1101). A similar description is applicable to other SVT patterns, such as the SVT patterns (1121) and (1211), the SVT patterns (1131) and (1221), and the SVT patterns (1151) and (1231).

Figure 13:
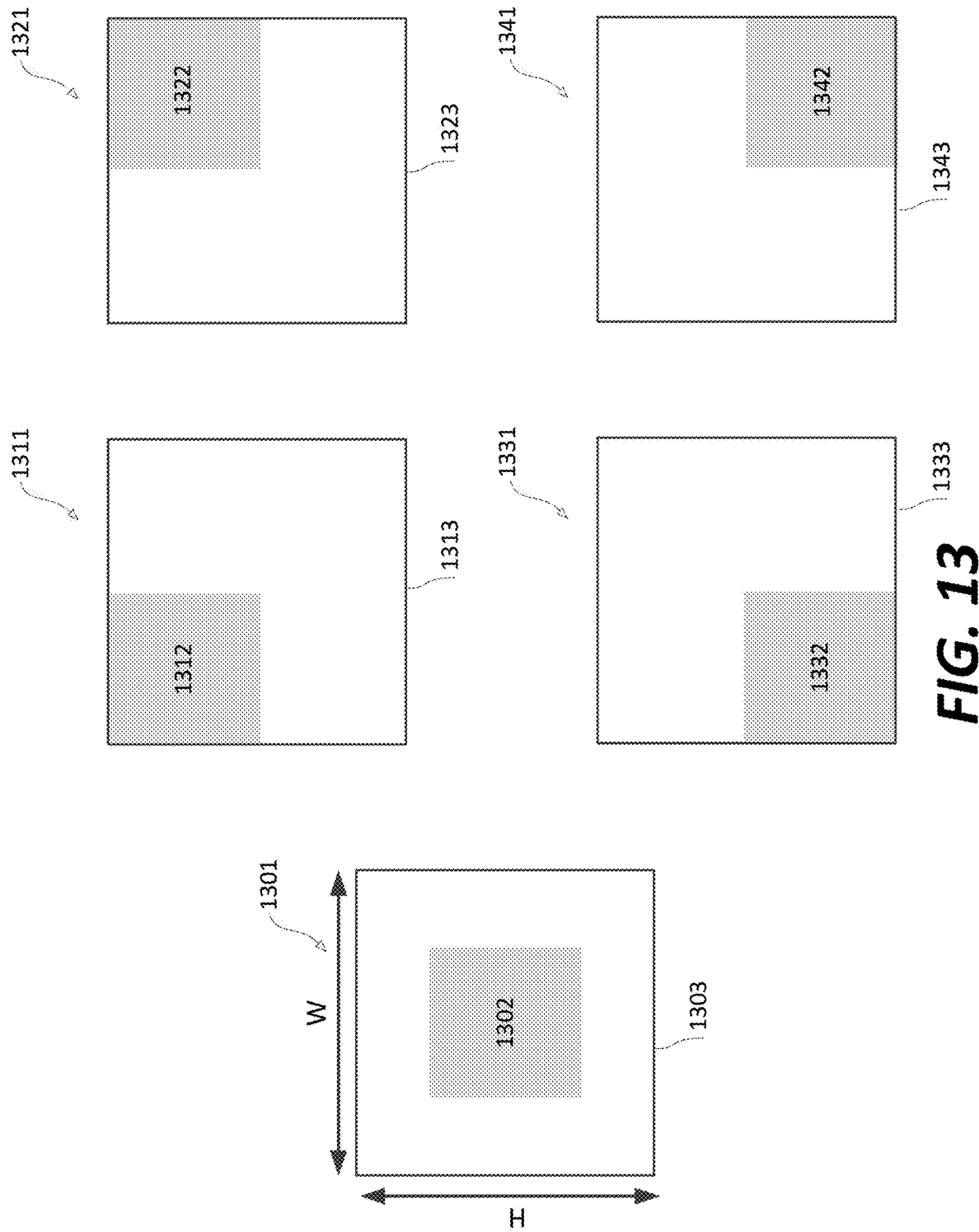
FIG. 13 shows examples of SVT patterns according to some embodiments.

In some embodiments, first samples in a CU that have relatively large residues can be located (or concentrated) near a center of the CU or at a corner of the CU. Accordingly, SVT patterns that are different from the SVT patterns shown in FIGS. 11-12 can be used. FIG. 13 shows SVT patterns according to some embodiments of the disclosure. Each CU (1303), (1313), (1323), (1333), and (1343) and a respective first sub-region (1302), (1312), (1322), (1332), and (1342) have a square shape. Further, a width of each of the first sub-regions (1302), (1312), (1322), (1332), and (1342) is 1/4 of a width (W) of each of the CUs (1303), (1313), (1323), (1333), and (1343), respectively. Further, a height of each of the first sub-regions (1302), (1312), (1322), (1332), and (1342) is 1/4 of a height (H) of each of the CUs (1303), (1313), (1323), (1333), and (1343), respectively. Thus, a width ratio and a height ratio is 1/4. The first sub-region (1302) is at a center of the CU (1303), and is separated from all edges of the CU (1303). In an example, the center of the CU (1303) can be determined implicitly, and thus, no position information is signaled for the SVT pattern (1301). The first sub-region (1312) is at a top-left corner of the CU (1313), the first sub-region (1322) is at a top-right corner of the CU (1323), the first sub-region (1332) is at a bottom-left corner of the CU (1333), and the first sub-region (1342) is at a bottom-right corner of the CU (1343). Accordingly, positions of the respective first sub-regions (1312), (1322), (1332), and (1342) are signaled.

In some examples, samples in a CU shown in FIGS. 12-13 are coded using inter prediction, and first and second samples in the CU have the same motion prediction information. For example, for the SVT pattern (1201) in the FIG. 12 example, the first samples in the first sub-region (1202) and the second samples in the CU that are outside the first sub-region (1202) can have the same motion prediction information.

A suitable SVT pattern can be selected from a group of SVT patterns, and thus, one or more indices to indicate characteristics of a first sub-region in a CU such as a position and/or a size of the first sub-region can be coded. In an example, context-adaptive binary arithmetic coding (CABAC) with a variable-length binarization can be used to code the one or more indices. In an example, position information can be signaled in the coded video bitstream, and subsequently decoded by a decoder.

In general, the SVT patterns in the group can include any suitable SVT patterns, such as one or more of the SVT patterns shown in FIGS. 11-13. In an example, a SVT group includes seven SVT patterns: (1111) and (1141) in FIG. 11, (1201), (1211), (1221), and (1231) in FIG. 12, and (1301) in FIG. 13. Table 6 shows an example of binarization associated with the SVT group according to an aspect of the disclosure. In an example, a first bin and a second bin of bins in the binarization code indicate whether a first sub-region is located at a center of the CU and whether the CU is split horizontally or vertically. Referring to Table 6, a '0' in the first bin indicates that the first sub-region is located at the center position, thus coding the SVT pattern (1301) and having an index of 0, a '10' in the first bin and the second bin indicates that the CU is split vertically, and coding one of the SVT patterns (1111), (1201), and (1211). Further, an '11' in the first bin and the second bin indicates that the CU is split horizontally, and coding one of the SVT patterns (1141), (1221), and (1231). The first and second bins can use different contexts to code. Another context can be used for other bins.

FIGS. 11-13 illustrate a first sub-region in a SVT pattern of different shapes, sizes, and positions within a respective CU. The size of the first sub-region can be represented using a width ratio and a height ratio. Alternatively, the size of the first sub-region can be represented using an area ratio of an area of the first sub-region over an area of the CU. The area ratio can be 1/4, 1/2, or the like. The width ratio and the height ratio can be 1/4, 1/2, 1, or the like. The position of the first sub-region can be at a center, at a corner, at an edge, or the like.

Table 6 shows an example of binarization associated with the SVT group

| Index | binarization | SVT pattern |
|---|---|---|
| 0 | 0 | 1301 |
| 1 | 101 | 1111 |
| 2 | 1000 | 1201 |
| 3 | 1001 | 1211 |
| 4 | 111 | 1141 |
| 5 | 1100 | 1221 |
| 6 | 1101 | 1231 |

As described above, a first sub-region is within a CU, and a single transform is implemented for first samples in the first sub-region. However, in some embodiments, multiple first sub-regions in adjacent neighboring CUs include first samples that have relatively large residues. In this case, a combined sub-region can be formed that includes the multiple first sub-regions that extend beyond one or more boundaries between the multiple CUs. Instead of implementing separate transforms for the first samples in the respective first sub-regions, a single transform is implemented for the first samples in the combined sub-region according to aspects of the disclosure, and thus improving coding efficiency. In general, the multiple CUs and the respective first sub-regions can have any suitable shapes, sizes, and relative positions, and thus, the combined sub-region and the combined CU can have any suitable shapes, sizes, and relative positions. Further, a number of the multiple CUs is an integer larger than 1.

Figure 14:
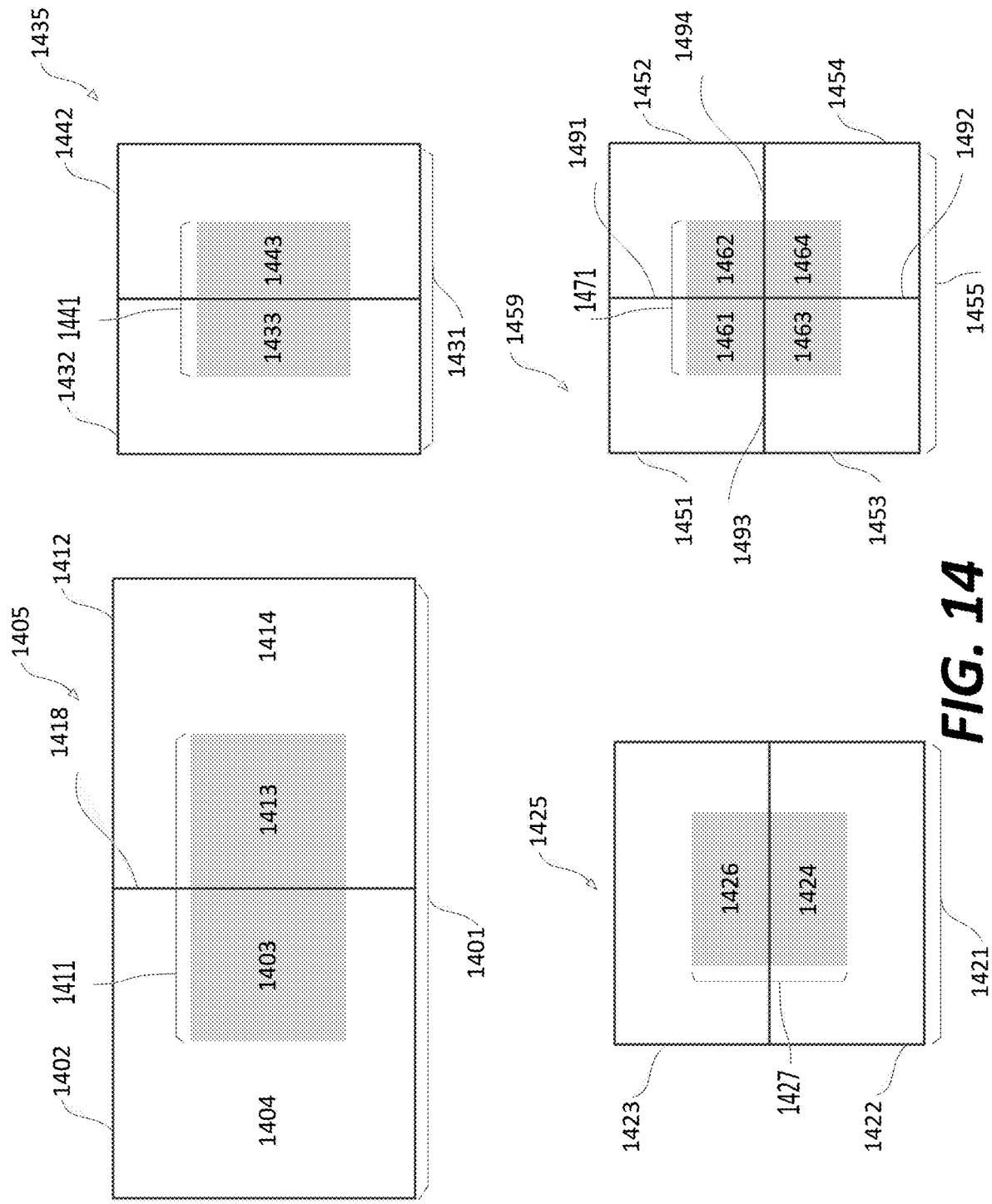
FIG. 14 shows examples of SVT patterns associated with combined sub-regions according to some embodiments.

FIG. 14 shows SVT patterns associated with combined sub-regions according to some embodiments of the disclosure. In the FIG. 14 examples, the combined sub-region is at a center of a combined CU including the multiple CUs.

In some examples, first sub-regions in 2 CUs are combined. For example, a SVT pattern (1405) is shown where a combined CU (1401) includes a CU (1402) and a CU (1412). The CU (1412) is adjacent to and is located to the right of the CU (1402). The CU (1402) includes a first sub-region (1403) having first samples with relatively large residues and a second sub-region (1404) that is outside the first sub-region (1403) having second samples with relatively small residues. Similarly, the CU (1412) includes a first sub-region (1413) having first samples and a second sub-region (1414) that is outside the first sub-region (1413) having second samples. A combined sub-region (1411) including the first sub-regions (1403) and (1413) is located at a center of the combined CU (1401). In the FIG. 14 example, the CUs (1402) and (1412) share a same boundary (1418), and the combined sub-region (1411) can override (or extend beyond) the boundary (1418). The combined sub-region (1411) is located within the CU (1402) and the CU (1412).

In the FIG. 14 example, the combined sub-region (1411) and the combined CU (1401) have a rectangular shape, a width ratio of a width of the combined sub-region (1411) over a width of the combined CU (1401) is equal to a first ratio, and a height ratio of a height of the combined sub-region (1411) over a height of the combined CU (1401) is equal to a second ratio. In an example, the first ratio is different from the second ratio. In another example, such as shown in FIG. 14, the first ratio is equal to the second ratio, and is 1/2, and thus, an area of the combined sub-region (1411) is 1/4 of the combined CU (1401).

At an encoder side, transform coefficients of the first samples in the combined sub-region (1411) can be determined by applying a single transform on the residual data of the first samples inside the combined sub-region (1411). Further, the residual data of the second samples of the combined CU (1401) that are outside the combined sub-region (1411) are not encoded. For example, the residual data of the second samples are not transformed into transform coefficients.

At a decoder side, the residual data of the first samples inside the combined sub-region (1411) can be determined by implementing an inverse transform of the transform coefficients of the first samples, for example, received from a coded video bitstream. Further, the first samples in the combined sub-region (1411) can be reconstructed using the residual data of the first samples, and the second samples can be reconstructed without residue data. For example, the transform coefficients of the second samples are not coded and are inferred to be 0. The CUs (1402) and (1412) can be coded with different motion prediction information. Further, non-residue information including the different motion prediction information of the CUs (1402) and (1412) is signaled before residue information associated with the CUs (1402) and (1412), and the residue information can include residual data associated with the combined sub-region (1411), information indicating a SVT pattern, a size, a shape, and a location of the combined sub-region (1411), and/or the like.

In the SVT pattern (1405), both the combined sub-region (1411) and the combined CU (1401) have a rectangular (and non-square) shape. In another example, a SVT pattern (1435) is shown where a combined CU (1431) includes a CU (1432) and a CU (1442) that is adjacent to the CU (1432). A combined sub-region (1441) and the combined CU (1431) have a square shape, and the combined sub-region (1441) is located at a center of the combined CU (1431). The CU (1432) includes a first sub-region (1433), and the CU (1442) includes a first sub-region (1443) that is adjacent to the first sub-region (1433). Operations similar to those described above can be implemented for the combined sub-region (1441) and the combined CU (1431) at an encoder and a decoder side, respectively, and thus, a detailed description is omitted for purposes of clarity.

In another example, a SVT pattern (1425) is shown where a combined CU (1421) includes a CU (1422) and a CU (1423), which is adjacent to the CU (1422). As illustrated in FIG. 14, the CU (1423) is above the CU (1422). A combined sub-region (1427) is located at a center of the combined CU (1421). The CU (1422) includes a first sub-region (1424), and the CU (1423) includes a first sub-region (1426) that is adjacent to and above the first sub-region (1424). Operations similar to those described above can be implemented for the combined sub-region (1427) and the combined CU (1421) at an encoder and a decoder side, respectively, and thus, a detailed description is omitted for purposes of clarity.

In another example, a number of the multiple CUs is 4, as shown in a SVT pattern (1459). A combined CU (1455) includes 4 neighboring CUs (1451)-(1454). The CUs (1451)-(1454) include neighboring first sub-regions (1461-1464), respectively. In an example, the first sub-region (1461) is at a bottom-right corner of the CU (1451), the first sub-region (1462) is at a bottom-left corner of the CU (1452), the first sub-region (1463) is at a top-right corner of the CU (1453), and the first sub-region (1464) is at a top-left corner of the CU (1454). As illustrated in FIG. 14, a combined sub-region (1471) is located at a center of the combined CU (1455), and crosses boundaries (1491)-(1494) of the neighboring CUs (1451)-(1454). Further, a width ratio and a height ratio are 1/2. In one example, the multiple CUs (1451)-(1454) can be coded with different motion prediction information. Operations similar to those described above can be implemented for the combined sub-region (1471) and the combined CU (1455) at an encoder and a decoder side, respectively, and thus, a detailed description is omitted for purposes of clarity. Further, in an embodiment, an additional flag, such as a combined SVT flag, can be signaled to indicate that a CU, such as the CU (1451), is a portion of the combined CU (1455) that includes the multiple CUs. A number of the multiple CUs, relative positions of the multiple CUs, a position, a size, and/or a shape of the respective first sub-region within each of the multiple CUs, and/or the like can also be signaled.

Figure 15:
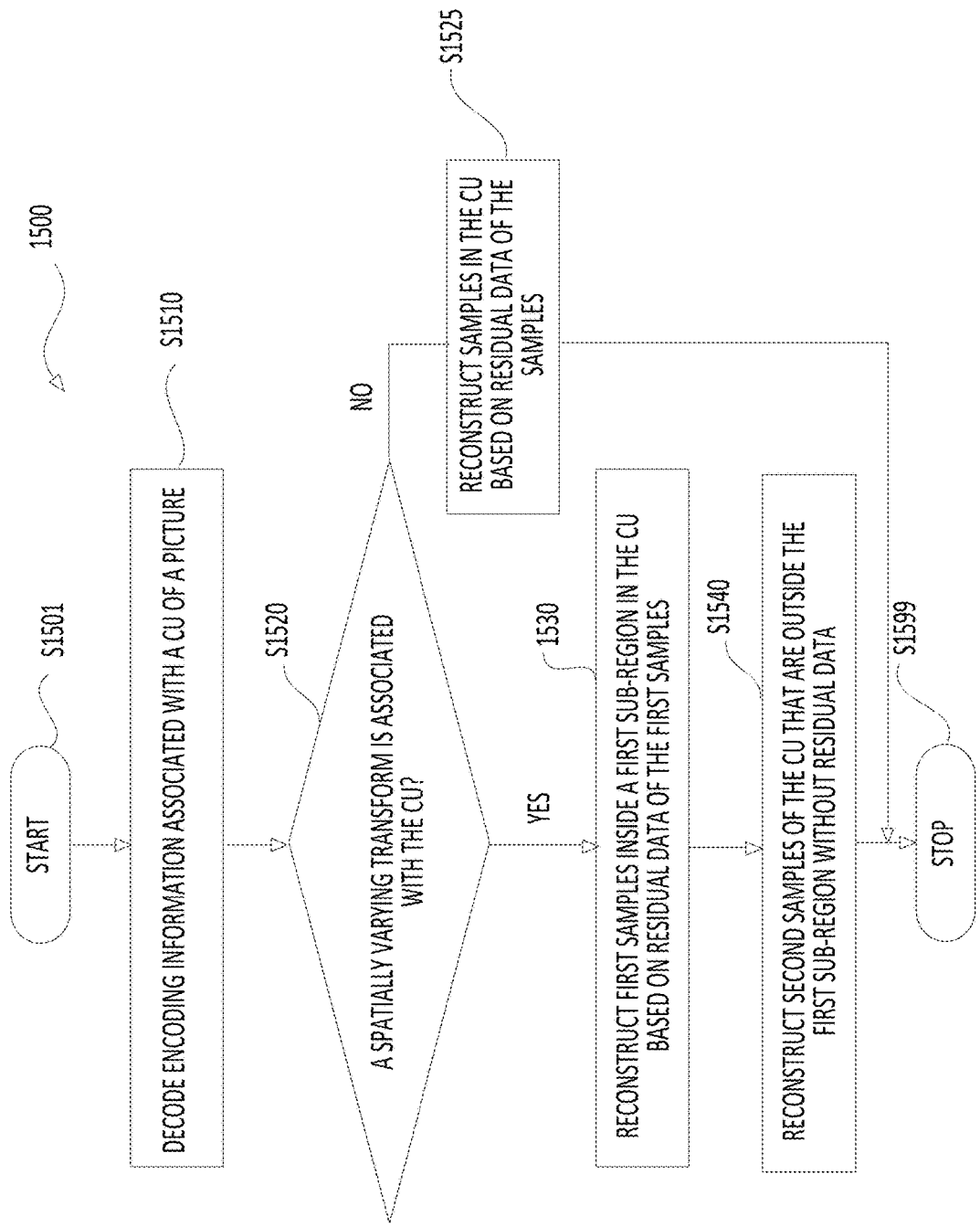
FIG. 15 shows a flow chart outlining a process according to an embodiment.

FIG. 15 shows a flow chart outlining a process (1500) according to an embodiment of the disclosure. The process (1500) can be used in the reconstruction of one or more blocks coded with inter prediction. In various embodiments, the process (1500) can be executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), the processing circuitry that performs functions of the predictor (535), the processing circuitry that performs functions of the decoder (710), the processing circuitry that performs functions of the inter decoder (780), the processing circuitry that performs functions of the reconstruction (774), and/or the like. In some embodiments, the process (1500) is implemented in software instructions, thus when the processing circuitry executes the software instructions, the processing circuitry performs the process (1500).

The process (1500) starts at (S1501) and proceeds to (S1510). At (S1510), encoding information associated with a CU of a picture in a coded video bitstream is decoded. The CU can be a luma coding CU, a chroma coding CU, or the like. The CU can have any suitable shape, size, and the like. The CU has a rectangular shape according to an embodiment, such as a square shape. In an example, the encoding information indicates that the CU is coded using inter prediction, and includes a SVT flag. The encoding information can also include additional information of a SVT pattern, such as a position, a shape, and/or a size of the SVT pattern with respect to the CU.

In some embodiments, the encoding information can also include a combined SVT flag to indicate that the CU is a portion of a combined CU, a number of multiple CUs in the combined CU, relative positions of the multiple CUs, a position, a size, and a shape of respective first sub-regions within each of the multiple CUs, and/or the like.

At (S1520), whether a SVT is associated with the CU is determined based on the encoding information. For example, when the encoding information includes the SVT flag, the CU is determined to be associated with the SVT. In another example, when the encoding information indicates that the CU is coded using intra prediction, the CU can be determined implicitly not to be associated with a SVT. Alternatively, when the CU is coded using inter prediction and a SVT flag is not signaled, the CU can be determined implicitly not to be associated with a SVT. When the CU is determined to be associated with the SVT, the process (1500) proceeds to (S1530). Otherwise, the process (1500) proceeds to (S1525).

At (S1525), samples in the CU are reconstructed based on residual data of the samples according to a suitable video coding technology and/or a video coding standard, such as the HEVC standard, the VVC standard, and the like. Subsequently, the process (1500) proceeds to (S1599), and terminates.

At (S1530), a SVT pattern including, for example, a position and a size of a first sub-region in the CU can be determined from the encoding information. As described above, the CU includes a first sub-region having first samples and a second sub-region having second samples where the second samples are outside the first sub-region.

The first samples inside the first sub-region are reconstructed based on residual data of the first samples. For example, an inverse transform is implemented on transform coefficients associated with the first samples to obtain the residual data of the first samples.

When the CU is determined to be a portion of the combined CU as described in (S1520), a combined sub-region within the combined CU is determined based on the encoding information. First samples inside the combined sub-region that includes the first sub-regions of the respective multiple CUs are reconstructed based on residual data of the first samples. In an example, a single inverse transform is implemented on transform coefficients associated with the first samples of the combined sub-region to obtain the residual data of the first samples. The multiple CUs can be coded with different motion prediction information, and thus, the first samples from the multiple CUs can be reconstructed using the different motion prediction information, respectively.

At (S1540), the second samples inside the second sub-region (and outside the first sub-region) are reconstructed without residual data. For example, the second samples of the CU can have the same motion prediction information with that of the first samples, and are reconstructed using the same motion prediction information.

When the CU is determined to be a portion of the combined CU as described in (S1520), the second samples of the combined CU that are outside the combined sub-region are reconstructed without residual data. For example, the multiple CUs can be coded with different motion prediction information, and thus, the second samples from the multiple CUs can be reconstructed using the different motion prediction information, respectively. Subsequently, the process (1500) proceeds to (S1599), and terminates.

As described above, a CU can include one or more coding blocks (CBs), such as one luma CB and two chroma CBs, where a CB includes a 2D sample array of a single color component associated with the CU. Therefore, the above description can be applied to a CB or multiple CBs.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bidirectional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
QT: Quadtree
AMVP: advanced motion vector prediction While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   decoding encoding information for a block of a picture in a coded video bitstream, the encoding information indicating a position of a sub-region in the block and a position of an additional sub-region in each of at least one neighboring block of the block, a combined sub-region including the sub-region and the additional sub-region in each of the at least one neighboring block being at a center of a combined block including the block and the at least one neighboring block, wherein an outside area within the combined block completely surrounds and is outside of the combined sub-region, the combined sub-region and the outside area being determined based on the combined sub-region having residue data of samples above a predetermined threshold and the outside area having residue data of samples below or equal to the predetermined threshold;

reconstructing first samples that are inside the combined sub-region using residue data of the first samples; and reconstructing second samples that are in the outside area without residue data.

2. The method of claim 1, wherein the combined sub-region and the combined block have a rectangular shape.

3. The method of claim 2, wherein the at least one neighboring block is a single block that is located to one of: the right of the block and below the block.

4. The method of claim 2, wherein a number of the at least one neighboring block is three neighboring blocks such that the combined block includes four blocks and the block is located at a top-left corner of the combined block.

5. The method of claim 2, wherein a width ratio of a width of the combined sub-region over a width of the combined block is 1/2, and a height ratio of a height of the combined sub-region over a height of the combined block is 1/2.

6. The method of claim 1, wherein the block and the at least one neighboring block are coded using inter prediction, and motion prediction information for the block is different from motion prediction information for the at least one neighboring block.

7. The method of claim 1, wherein the block and the at least one neighboring block are coded using inter prediction, motion prediction information for the block and the at least one neighboring block is signaled before information of the residue data of the first samples.

8. The method of claim 1, wherein the encoding information further indicates a size of the sub-region and a size of the additional sub-region in each of the at least one neighboring block of the block.

9. A method for video decoding in a decoder, comprising:
decoding encoding information for a block of a picture in a coded video bitstream, the encoding information indicating a combination of a position of a sub-region in the block and a relative size of the sub-region with respect to the block, wherein first samples inside the sub-region are reconstructed using residue data of the first samples, second samples of the block that are outside of the sub-region in an outside area are reconstructed without residue data, and the combination of the position and the relative size is one of multiple combinations of different positions and different relative sizes, wherein the outside area is adjacent to at least two different sides of the sub-region, the sub-region and the outside area being determined based on the sub-region having residue data of samples above a predetermined threshold and the outside area having residue data of samples below or equal to the predetermined threshold;

reconstructing the first samples of the block that are inside the sub-region using the residue data of the first samples; and reconstructing the second samples of the block that are outside of the sub-region without residue data.

10. The method of claim 9, wherein
the block and the sub-region have a rectangular shape;
the relative size is associated with a width ratio being a width of the sub-region over a width of the block and a height ratio being a height of the sub-region over a height of the block; and
the multiple combinations of different positions and different relative sizes include: 1) the position is a center of the block, the width ratio and the height ratio are 1/2,
2) the position is a center of the block, the width ratio is 1/2 and the height ratio is 1, 3) the position is a left side of the block, the width ratio is 1/4 and the height ratio is 1, 4) the position is a right side of the block, the width ratio is 1/4 and the height ratio is 1, 5) the position is a center of the block, the width ratio is 1 and the height ratio is 1/2, 6) the position is a top side of the block, the width ratio is 1 and the height ratio is 1/4, and 7) the position is a bottom side of the block, the width ratio is 1 and the height ratio is 1/4.

11. The method of claim 9, wherein:
the encoding information includes an index indicating the one of the multiple combinations of different positions and different relative sizes; and
the method further includes receiving the index in the coded video bitstream.

12. The method of claim 9, wherein the different relative sizes include a relative size of the sub-region being 1/4 of the block.

13. An apparatus, comprising processing circuitry configured to:
decode encoding information for a block of a picture in a coded video bitstream, the encoding information indicating a position of a sub-region in the block and a position of an additional sub-region in each of at least one neighboring block of the block, a combined sub-region including the sub-region and the additional sub-region in each of the at least one neighboring block being at a center of a combined block including the block and the at least one neighboring block, wherein an outside area within the combined block completely surrounds and is outside of the combined sub-region, the combined sub-region and the outside area being determined based on the combined sub-region having residue data of samples above a predetermined threshold and the outside area having residue data of samples below or equal to the predetermined threshold;

reconstruct first samples that are inside the combined sub-region using residue data of the first samples; and reconstruct second samples that are outside of the combined sub-region in the combined block without residue data.

14. The apparatus of claim 13, wherein the combined sub-region and the combined block have a rectangular shape.

15. The apparatus of claim 14, wherein the at least one neighboring block is a single block that is located to one of: the right of the block and below the block.

16. The apparatus of claim 14, wherein a number of the at least one neighboring block is three neighboring blocks such that the combined block includes four blocks and the block is located at a top-left corner of the combined block.

17. The apparatus of claim 14, wherein a width ratio of a width of the combined sub-region over a width of the combined block is 1/2, and a height ratio of a height of the combined sub-region over a height of the combined block is 1/2.

18. The apparatus of claim 13, wherein the block and the at least one neighboring block are coded using inter prediction, and motion prediction information for the block is different from motion prediction information for the at least one neighboring block.

19. The apparatus of claim 13, wherein the block and the at least one neighboring block are coded using inter prediction, motion prediction information for the block and the at least one neighboring block is signaled before information of the residue data of the first samples.

20. The method of claim 1, wherein the predetermined threshold is a threshold of determined residue data.

* * * * *